United States Patent [19]
Tokuda et al.

[11] Patent Number: 5,489,319
[45] Date of Patent: Feb. 6, 1996

[54] APPARATUS FOR PURIFYING EXHAUST GAS OF DIESEL ENGINE

[75] Inventors: Kimimichi Tokuda, Ikoma; Kouichi Watanabe, Miyazaki; Junichi Onoue, Takatsuki, all of Japan

[73] Assignee: Matsushita Electric Industrial Co., Ltd., Kadoma, Japan

[21] Appl. No.: 123,854

[22] Filed: Sep. 9, 1993

[30] Foreign Application Priority Data

Sep. 9, 1992 [JP] Japan ................................. 4-240316

[51] Int. Cl.$^6$ ......................... F01N 3/02; B01D 46/04
[52] U.S. Cl. ................. 55/213; 55/217; 55/283; 55/523; 55/DIG. 30; 60/286; 60/311
[58] Field of Search ................ 55/263, 217, 269, 55/283, 466, 523, DIG. 30, 385.3; 60/286, 288, 303, 311; 95/14, 15, 20, 21, 22

[56] References Cited

U.S. PATENT DOCUMENTS

| | | | |
|---|---|---|---|
| 4,404,795 | 9/1983 | Oishi et al. | 60/311 X |
| 4,512,147 | 4/1985 | Wong | 60/274 |
| 4,522,027 | 6/1985 | Hasegawa et al. | 55/DIG. 30 |
| 4,538,411 | 9/1985 | Wade et al. | 55/283 |
| 4,538,412 | 9/1985 | Oishi et al. | 55/DIG. 30 |
| 4,544,388 | 10/1985 | Rao et al. | 55/DIG. 30 |
| 4,631,076 | 12/1986 | Kurihara et al. | 55/283 |
| 4,643,749 | 2/1987 | Miura | 55/DIG. 30 |
| 4,651,524 | 3/1987 | Brighton | 60/311 X |
| 4,665,690 | 5/1987 | Nomoto et al. | 55/283 X |
| 4,803,838 | 2/1989 | Kaeser | 60/288 |
| 4,923,484 | 5/1990 | Saito | 95/20 |
| 4,934,142 | 6/1990 | Hayashi et al. | 60/311 X |
| 5,067,318 | 11/1991 | Arai | 55/DIG. 30 |
| 5,067,973 | 11/1991 | Pattes | 55/DIG. 30 |
| 5,085,049 | 2/1992 | Rim et al. | 55/DIG. 30 |
| 5,090,200 | 2/1992 | Arai | 55/DIG. 30 |
| 5,105,619 | 4/1992 | Arai | 60/286 |
| 5,195,316 | 3/1993 | Shinzawa et al. | 60/286 X |

FOREIGN PATENT DOCUMENTS

| | | |
|---|---|---|
| 3806219 | 9/1989 | Germany . |
| 4042048 | 12/1990 | Germany . |
| 58-128413 | 8/1983 | Japan . |
| 91/13242 | 9/1991 | WIPO . |

OTHER PUBLICATIONS

Igarashi et al., "Development of Diesel Particulate Trap Systems for City Buses", Jan. 25, 1991, pp. 83–92.

*Primary Examiner*—Jay H. Woo
*Assistant Examiner*—Duane S. Smith
*Attorney, Agent, or Firm*—Willian Brinks Hofer Gilson & Lione

[57] ABSTRACT

Apparatus for purifying exhaust gas from a diesel engine includes a wall-flow filter made of a porous ceramic material for capturing carbon components contained in the exhaust gas and burning up the captured carbon components, a first exhaust pipe for introducing the exhaust gas into the filter, a second exhaust pipe for introducing the exhaust gas purified by the filter a bypass pipe bypassing the filter, first and second valves arranged inside of the first and bypass pipes, respectively, for controlling the exhaust gas flow, a heater for burning up carbon components captured in the filter, first and second temperature sensors for detecting temperatures in the first pipe and the filter, respectively, and a controller for controlling opening and closing of the first and second valves based on the temperature difference between temperatures detected by first and second temperature sensors to prevent the filter from cracking.

7 Claims, 13 Drawing Sheets

APPARATUS FOR PURIFYING EXHAUST GAS OF DIESEL ENGINE

BACKGROUND OF THE INVENTION

1. Field of the Invention

The present invention relates to apparatus for purifying exhaust gas such that particulate matter material such as soot in the exhaust gas of an internal combustion engine such as a diesel engine is trapped by a filter.

2. Description of the Related Art

Recent development of transportation means is remarkable, and travel over a long distance has become part of our everyday life. On the other hand the development has had unfavorable effects on the global environment. In particular, air pollution caused by the exhaust gas of internal combustion engines is presently one of the greatest problems. In Japan, the air of large cities such as Tokyo, Nagoya, and Osaka is so polluted that people hesitate to open the windows of their driving cars. Air pollution is said to be a cause of lung cancer. It is a problem human beings must solve.

In order to keep the air pollution at a minimum level, cleaning of the exhaust gas of internal combustion engines has been developed.

Figure 12:
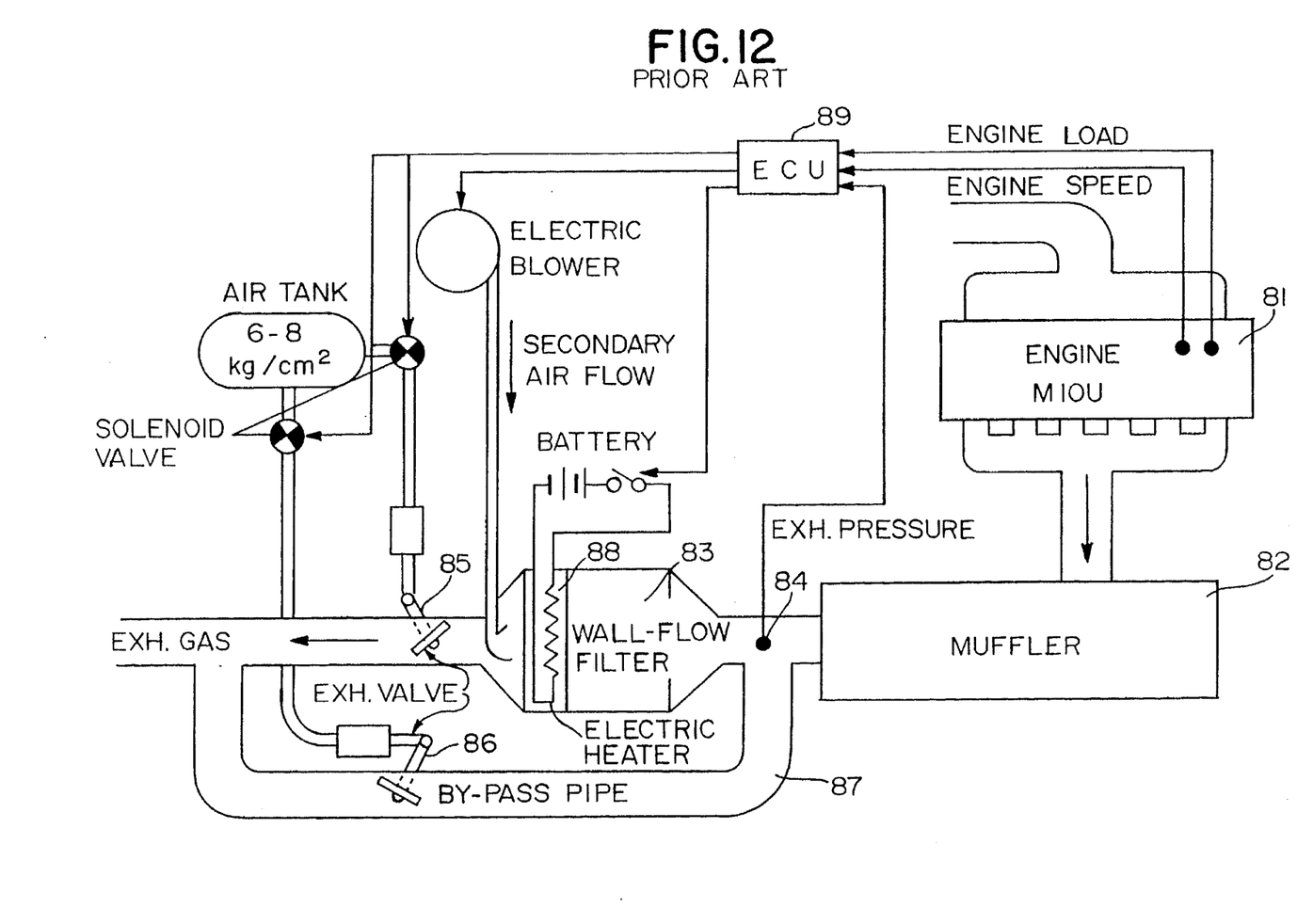
FIG. 12 shows a block diagram of a conventional apparatus for purifying exhaust gas.

As a prior apparatus for cleaning exhaust gas, there is, for example, one described in SAE (Society of Automotive Engineers: The Engineering Society For Advancing Mobility Land Sea Air and Space; registered trade mark) P-240, Jan. 25, 1991, pp 83–92. FIG. 12 shows the prior apparatus for purifying exhaust gas. As shown in FIG. 12, in the prior apparatus, the exhaust gas from a diesel engine 81 is first muffled by a muffler 82 and then purified by a filter 83. The filtering function of filter 83 is reduced after its use for a certain time period, during which carbon or soot components adhere to the filter. Therefore, in the prior apparatus, an exhaust pressure sensor 84 detects the malfunction of a filter. Then a controller ECU 89 closes a valve 85 and opens a valve 86 to discharge the exhaust gas through a by-pass pipe 87, while heating up filter 83 by an electric heater 88 installed in the filter to burn up carbon components trapped in filter 83 and to reactivate the filter.

In this type of exhaust gas purifying apparatus, the filter is made of ceramic material. Table 1 shows characteristics of main ceramic materials used for exhaust gas filters, and Table 2 shows characteristics of typical particulate filters.

TABLE 1

| Ceramic Materials | Melting point (°C.) | Maximum working temperature (°C.) | Thermal expansion coefficient ($\times 10^{-6}$/°C.) |
|---|---|---|---|
| Silica ($SiO_2$) | 1730 | 900 | 0.5 |
| Cordierite ($2MgO \cdot 2Al_2O_3 \cdot 6SiO_2$) | 1465 | 1000 | 1.5 |
| Mullite ($3Al_2O_3 \cdot 2SiO_2$) | 1840 | 1200 | 5.0 |
| Alumina ($Al_2O_3$) | 2045 | 1500 | 8.8 |
| Zirconia ($ZrO_2$) | 2580 | 1600 | 10.0 |

TABLE 2

| | Fiber ceramic | Ceramic honeycomb | Ceramic foam | Wire mesh |
|---|---|---|---|---|
| Composition | Mullite | Cordierite | Cordierite | Stainless Steel |
| Volume density (g/c ml) | 0.3 ~ 0.4 | 1.6 ~ 1.8 | 0.3 ~ 0.4 | — |
| Vacancy rate (%) | 85 ~ 92 | 35 ~ 50 | 84 ~ 88 | 90 ~ 98 |
| Maximum working temperature (°C.) | 1200 | 1000 | 1000 | 700 |
| Thermal expansion coefficient (/°C.) | $5 \times 10^{-6}$ | $1 \times 10^{-6}$ | $1 \times 10^{-6}$ | — |
| Thermal conductivity (Kcal /mh °C.) | 0.05 | 0.70 | 0.70 | — |
| Thermal shock resistance (°C.) | 1000 | 600 | 800 | — |
| Against chemicals | Stable | Stable | Stable | — |

As seen from these tables, Ceramics are very weak against a rapid change of temperature. Therefore, when the engine is working at a high load while after by-passing the exhaust gas, the controller switches the valves to force the exhaust gas to flow into the filter, then exhaust gas at over 500° C. flows into the filter, and the filter is heated rapidly and cracked by the rapid change of temperature, so that the filter will not properly function.

Figure 13:
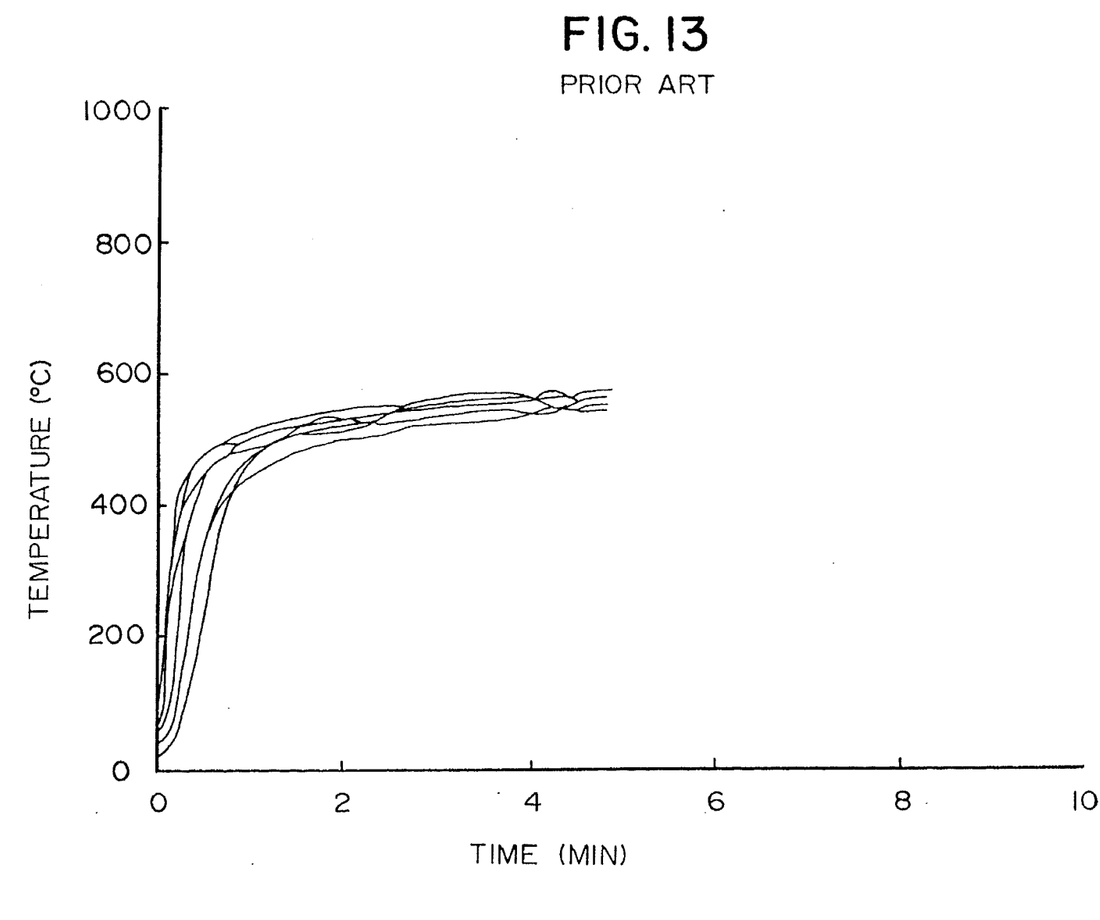
FIG. 13 shows changes of temperature in filters the conventional apparatus for purifying exhaust gas.

FIG. 13 shows time/temperature characteristics inside a filter when the prior engine switches the valves during its work at a high load to force the exhaust gas to flow into the filter. In FIG. 13, each line shows each of outputs of plural temperature sensors arranged at various positions in the filter. As is clearly shown in FIG. 13, the internal temperature of the filter rises upto 500° C. or more within 30 seconds or so and this rapid temperature rise causes cracks in the ceramic material used for the filter. In fact, many cracks were observed in the filter when inspected after the experiment.

SUMMARY OF THE INVENTION

An object of the present invention is therefore to prevent the cracking of a ceramic filter due to a rapid change of temperature and to provide an apparatus for purifying exhaust gas that properly functions as an exhaust gas filter.

In order to achieve the aforementioned objective, an apparatus for cleaning exhaust gas in accordance with the present invention comprises a filter that impacts and absorbs carbon components in the exhaust gas from an engine and burns up the adhering carbon components after a certain amount of them is deposited to activate the filter itself, a first pipe that leads the exhaust gas from the engine into the filter, a second pipe that leads the exhaust gas cleaned by the filter into a muffler, a by-pass pipe that branches off from the first pipe and is connected to the second pipe to by-pass the exhaust gas from the first pipe into the second pipe, a first valve that is installed inside the first pipe and controls the flow of exhaust gas into the filter, a second valve that is installed inside the by-pass pipe and controls the flow of exhaust gas in the by-pass pipe, a first temperature detector that detects the temperature of exhaust gas in the first pipe, a second temperature detector that detects the temperature of the filter, a heating system that heats up the filter, and a controller that controls the heating system, the first valve, and the second valve based on the outputs of the first temperature detector, the second temperature detector, and the engine. The controller controls the opening and closing of the valves based on the difference of temperatures detected by the first temperature detector and the second temperature detector by closing the first valve and opening the second valve, if the difference exceeds a certain value, According to another feature of the present invention, there is provided an apparatus of cleaning exhaust gas such that the detection of the temperatures is omitted, and the controller controls the opening and closing of the valves based on the lapse of time after the starting of the engine or based on a preprogrammed routine. For example, the controller closes the first valve and opens the second valve, when the engine has started, or the exhaust gas has not flowed into the filter for a certain time period (the temperature of the filter has declined).

By means of the above compositions, the present invention controls the first and second valves by detecting the temperatures of the exhaust gas and the ceramic filter with temperature detectors or by considering a rapid change of temperature immediately after the starting of the engine in order not give a rapid change of temperature to the filter, so that cracking of the ceramic filter is prevented.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

The preferred embodiments according to the present invention will be described below with reference to the accompanying drawings.

[First Embodiment]

Figure 1:
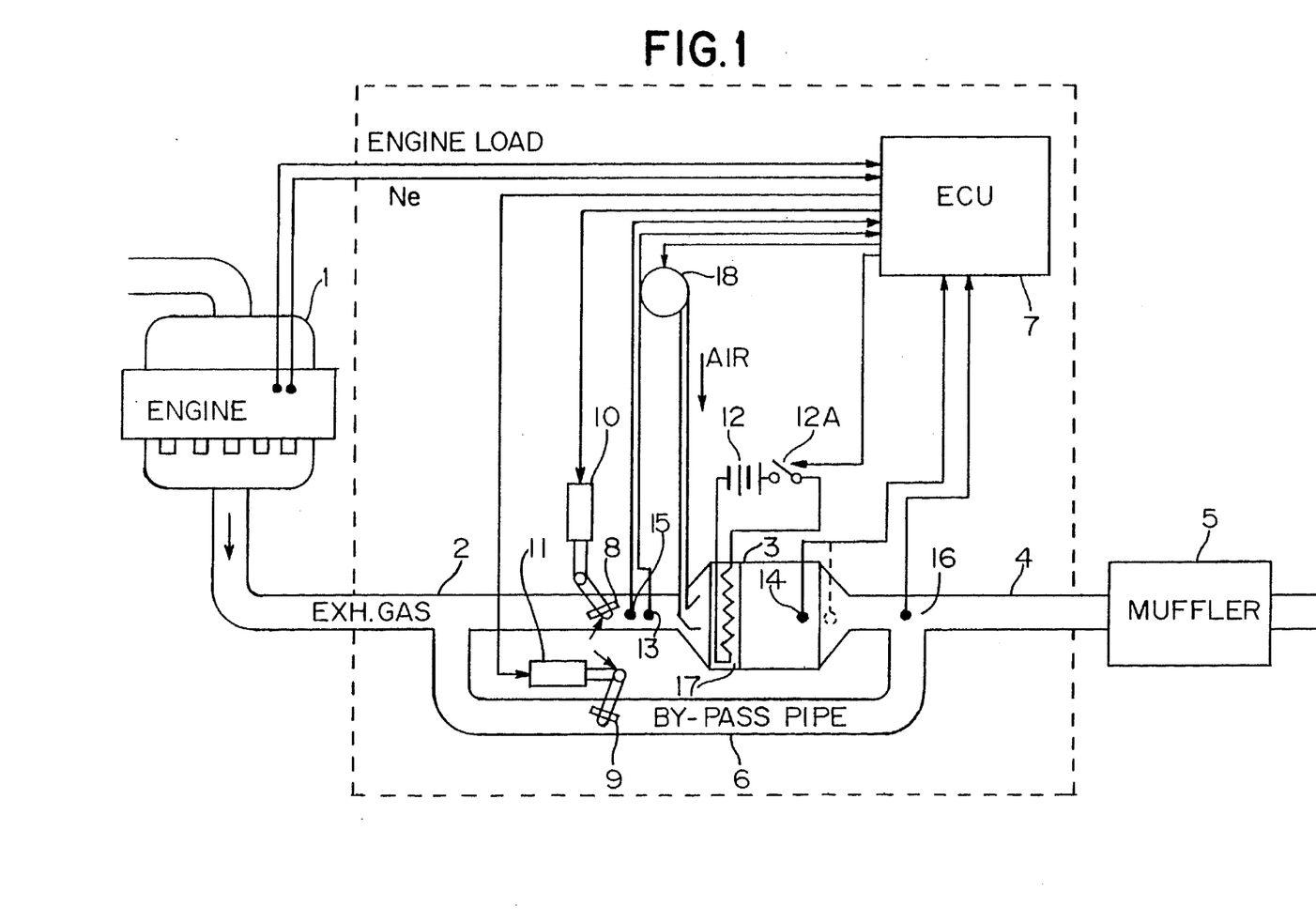
FIG. 1 shows a block diagram of a first embodiment in accordance with the present invention.

In the following is described a first embodiment in accordance with the present invention with reference to the drawings. FIG. 1 shows a block diagram of the first embodiment in accordance with the present invention. In FIG. 1, reference numeral 1 denotes an engine, 2 denotes a first pipe for leading the exhaust gas of the engine into a filter, 3 denotes a filter that cleans exhaust gas by impacting particulate matter of carbon components and others in exhaust gas, and 4 denotes a second pipe that leads exhaust gas discharged from filter 3 into a muffler 5, which reduces exhaust sound. 6 denotes a by-pass pipe that connects first pipe 2 and second pipe 4 to lead exhaust gas into muffler 5 bypassing filter 3, 7 denotes a controller that controls valves 8, 9, a heating system 17, a blower 18 and others based on the outputs of engine 1, temperature detectors 13, 14, and pressure sensors 15, 16. Controller 7 comprises a CPU and memory. 8 denotes a valve installed inside first pipe 1 and controls the flow of exhaust gas into filter 3. The present embodiment uses a valve such that a disk is rotated to control the flow in a pipe. 9 denotes a valve of the same type and controls the flow in by-pass pipe 6. 10 and 11 denote actuator that respectively actuate valves 8 and 9, and the present embodiment uses a stepping motor to control them open loop.

12 denotes a battery that stores energy for burning up carbon components captured and deposited in filter 3, and the present embodiment uses type 24V300Ah. Battery 12 is charged by a dynamo, and its switch 12a is set to turn ON by controller 7 to provide an electric current to heating system 17 to burn up carbon components deposited in filter 3. 13 and 14 denote temperature detectors that detect the temperature $T_1$ of exhaust gas in pipe 2 and the temperature $T_2$ of filter 3, and the present invention uses thermo-couples. Temperature detector 14 may be installed in the rear of filter 3. 15 and 16 denote pressure sensors that detect the pressures $P_1$ and $P_2$ of exhaust gas in the pipes, and the present embodiment uses pressure sensors comprising semiconductors. 18 denotes a blower that blows air into filter 3 to prompt the burnup of carbon components in filter 3.

Figure 2:
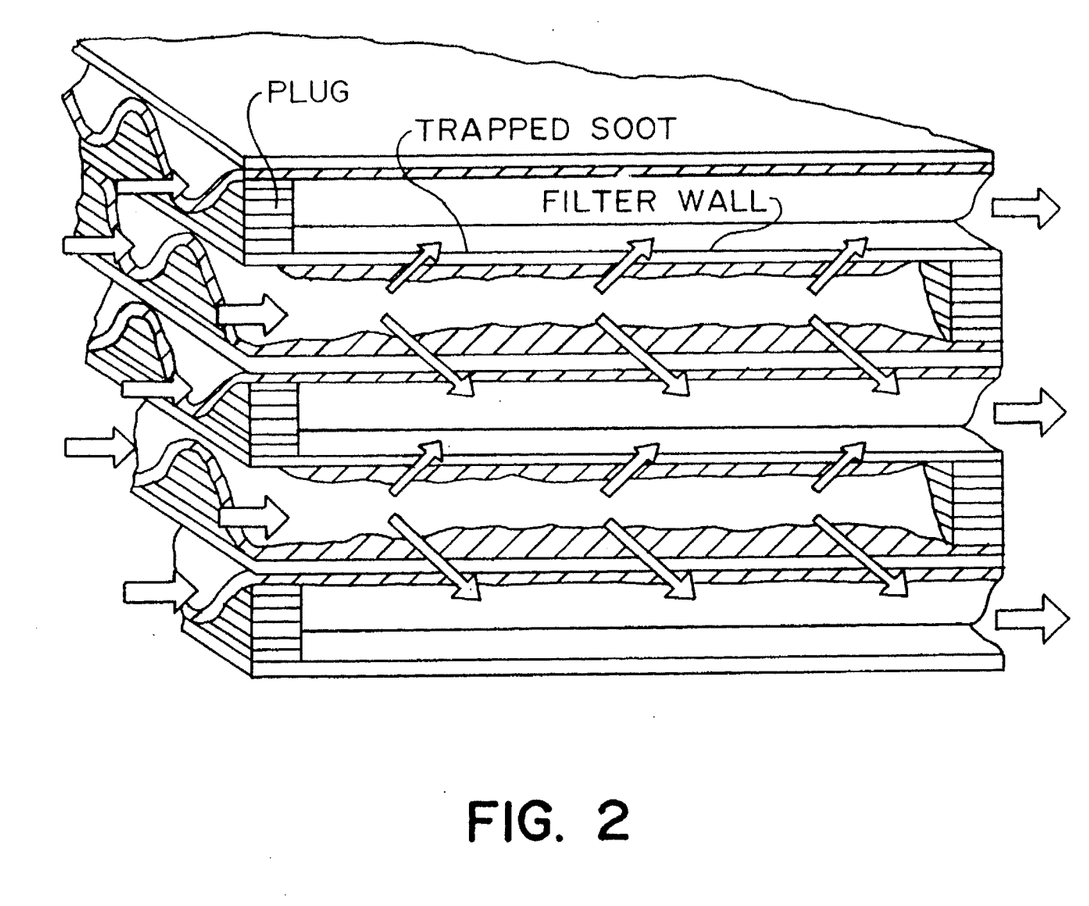
FIG. 2 shows a partially sectioned perspective view of a filter used for the embodiment in accordance with the present invention.

FIG. 2 shows a partially cut perspective view of filter 3 used in the present embodiment. The material of filter 3 is mullite ($3Al_2O_3 \cdot 2SiO_2$), and the structure of the filter is fiber.

Figure 3:
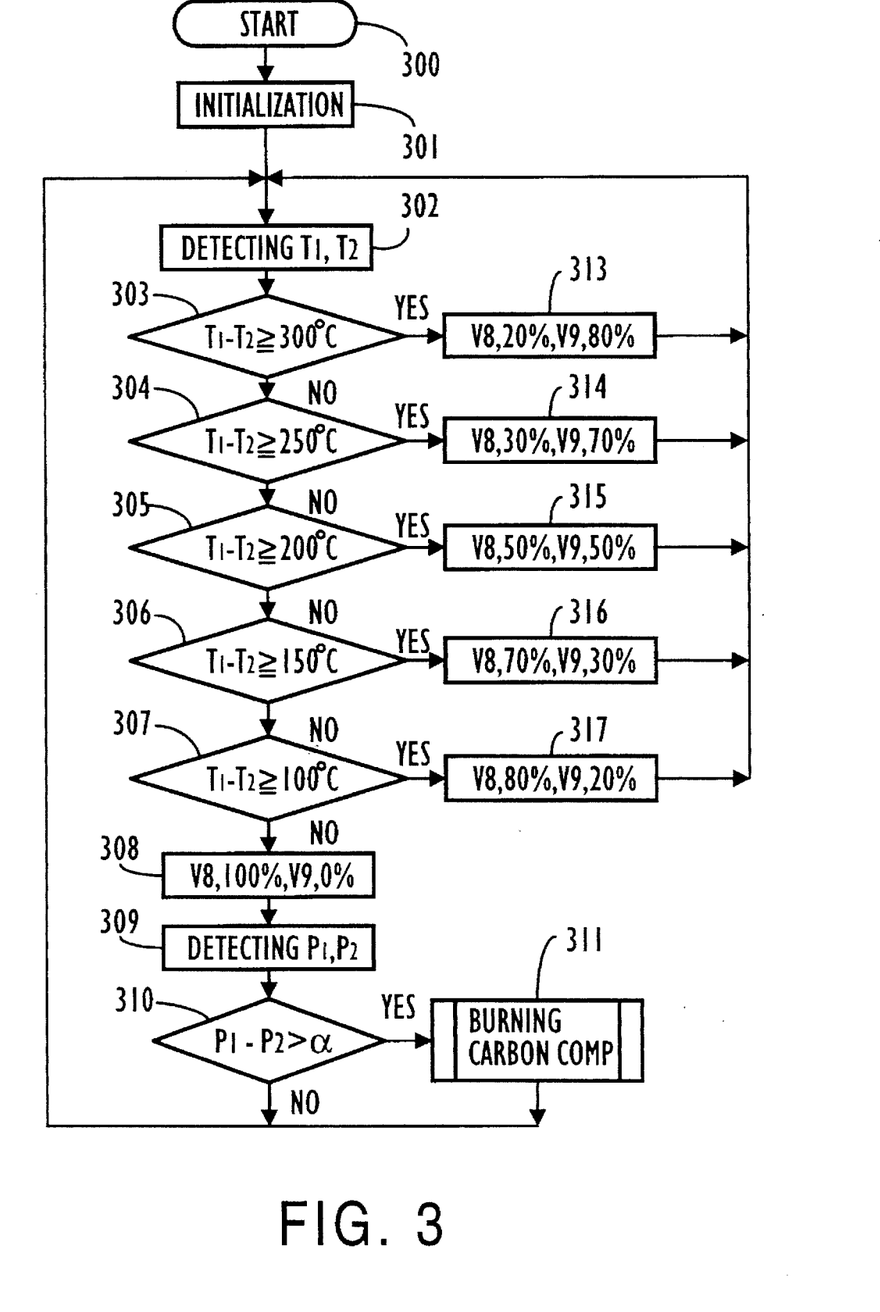
FIG. 3 is a flowchart that shows the operation of the first embodiment.

The operation of the apparatus for purifying exhaust gas of the present embodiment is described in the following with reference to the flowchart shown in FIG. 3.

Figure 4:
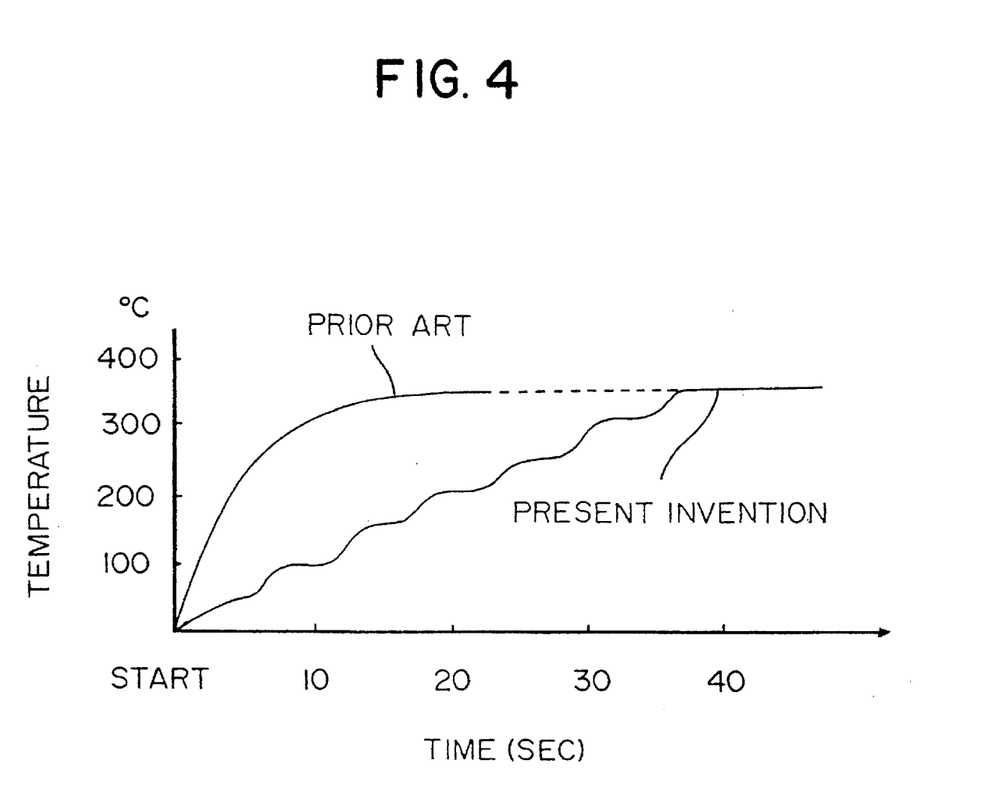
FIG. 4 shows a change of temperature in a filter of the embodiment in accordance with the present invention.

If an engine is started, and the power is supplied to the present apparatus, Step 301 initializes temperature detectors 13, 14, pressure sensors 15, 16, valves 8, 9, and others. Valve 8 is initialized to the open state, and valve 9 is initialized to the closed state. After the engine is started, and exhaust gas is flowing into filter 3 through first pipe 2 and valve 8, Step 302 detects the temperature T1 of the exhaust gas and the temperature T2 of filter 3. Step 303 compares the detected temperatures T1 and T2, and if the difference between T1 and T2 is greater than or equal to a constant, then the operation goes to Step 313; otherwise, the operation goes to 304. The constant is set to 300° C. in the present embodiment. Similarly, the difference between T1 and T2 is further classified into six cases: 250°~300° C., 200°~250° C., 150°~200° C., 100°~150° C., and below 100° C. If Step 303 judges that the difference between T1 and T2 is greater than or equal to 300° C., then Step 313 opens valve 8 by 20% and opens valve 9 by 80% to prevent hot exhaust gas from rapidly flowing into filter 3, while sending a small quantity of exhaust gas into filter 3 to gradually increase the temperature of filter 3. Then the operation returns to Step 302 to detect the temperatures T1 and T2 again. If Step 303 judges that the difference between T1 and T2 is less than 300° C., then Step 304 judges if the difference is greater than or equal to 250° C. If the difference is greater than or equal to 250° C., then Step 314 opens valve by 30% and opens valve 9 by 70%, so that more exhaust gas flows into filter 3, and the temperature of the filter increases. Similarly, Step 305, 306, and 307 classifies the temperature difference between T1 and T2, and the opening of the valves are performed depending on the classified cases and based on previously calculated results. Specifically, as shown in FIG. 3, if the temperature difference is 200° C.~250° C., Step 315 opens valve 8 by 50% and valve 9 by 50%. If the temperature difference is 150° C.~200° C., then Step 306 opens valve 8 by 70% and valve 9 by 30%. If the temperature difference is 100° C.~150° C., then Step 307 opens valve 8 by 80% and valve 9 by 20%. If the temperature difference is less than 100° C., then Step 308 opens valve 8 by 100% and closes valve 9. In this way, by preventing a great amount of exhaust gas of high temperature from rapidly flowing into filter 3 and by gradually increasing the temperature of filter 3, the present embodiment prevents cracking of filter 3. FIG. 4 shows how the temperature of filter 3 increases after the starting of the engine, when an apparatus of the present embodiment is used. As seen from FIG. 4, the temperature of filter 3 increases with a smaller temperature gradient than a conventional apparatus.

If the temperature of filter 3 increases beyond a certain point, then conditions become normal, and the apparatus does not perform the above operation. However, if the temperature difference between filter 3 and the exhaust gas becomes exceedingly high by some causes, then the above operation is performed to prevent cracking of filter 3. For example, if the driver wants to travel at the maximum power of the engine, he may close valve 8 and open valve 9 not to use filter 3. Further, if only urban areas are exhaust-gas regulated, then the driver may use filter 3 only when traveling in an urban area and may travel on roads outside urban areas without using filter 3. In these cases, filter 3 is cooled to become a normal temperature, so that the operation should be applied to prevent cracking of filter 3.

If the temperature of filter 3 has increased to the degrees of normal driving, then Step 309 measures and detects the pressures P1, P2 of the exhaust gas in the first pipe and the second pipe by pressure sensors 15, 16. Next, Step 310 compares the detected pressures P1 and P2. If the difference between P1 and P2 is greater than a constant, then filter 3 is judged to be stuffed and malfunctioning, and the operation goes to Step 311. Since the present embodiment uses a cylindrical filter 5. 66 inches in diameter and 6.00 inches long, the carbon components deposited in filter 3 are burned up, when the pressure difference between P1 and P2 reaches 1000 mmHg. The predetermined constant for the pressure difference depends on the shape and material of filter 3. Step 311 heats up filter 3 by heating system 17 and blows air in by blower 18, so that the deposited soot or the like is burned up and filter 3 is made cleanly reactivated.

Figure 5:
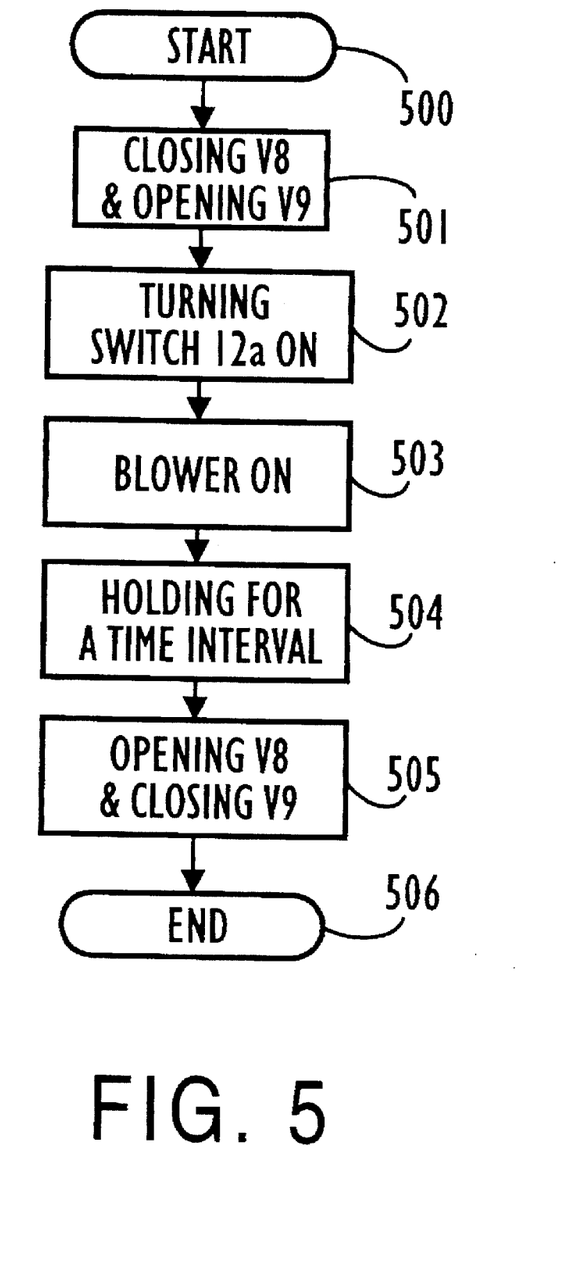
FIG. 5 is a flowchart that shows the operation of burning up carbon components by the embodiment in accordance with the present invention.

FIG. 5 shows a flowchart of the burnup operation of carbon components. Since this operation is the same as a prior one, its description is omitted. Although no indicated in the flowchart, catalysts may be used to lower the combustion temperature as in a prior operation. After carbon components are burned up by Step 31, the operation of the apparatus for cleaning exhaust gas of the present embodiment returns to Step 302 and repeats the same routine described above.

As described above, the present embodiment detects the temperature of exhaust gas flowing into filter 3, and if the detected temperature is greatly different from the temperature of filter 3, then valves 8 and 9 are controlled so that too large quantity of exhaust gas of high temperature is not impacted against filter 3. As a result, cracking of filter 3 due to a rapid temperature change can be prevented.

[Second Embodiment]

Figure 6:
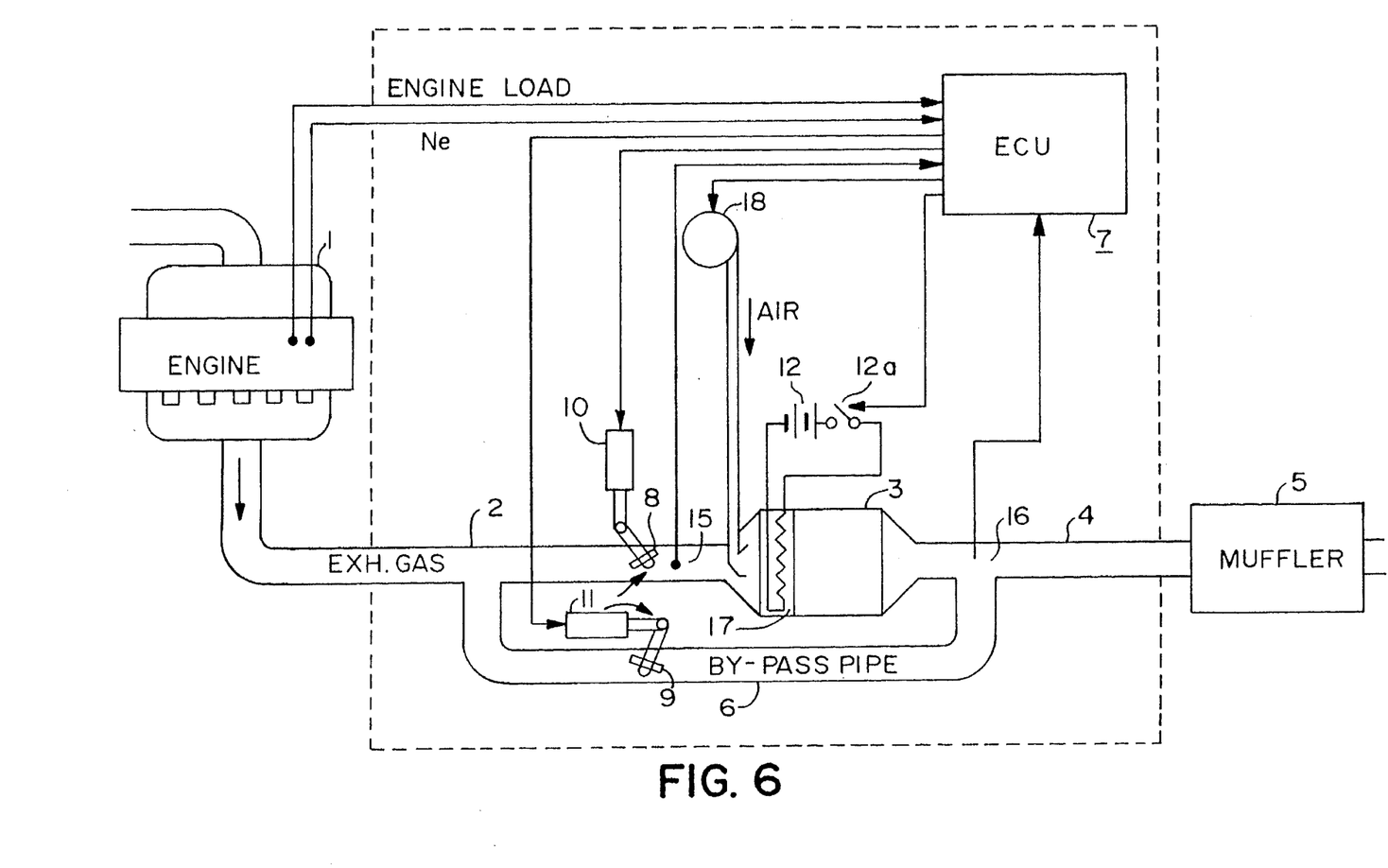
FIG. 6 shows a block diagram of a second embodiment in accordance with the present invention.

In the following is described a second embodiment in accordance with the present invention with reference to the drawings. FIG. 6 shows a block diagram of the present embodiment. In FIG. 6, a component similar to one in the first embodiment has the same number. The second embodiment is different from the first embodiment in that temperature detectors 13 and 14 are omitted. The present embodiment simplifies and improves the first embodiment. The reason for omitting temperature detectors are as follows. A change of temperature that destroys filter 3 occurs, when exhaust gas of high temperature flows into cool filter 3 immediately after the engine is started or after driving without using filter 3. Therefore, the same effects as those of the first embodiments are obtained if a similar operation of gradually giving exhaust gas to filter 3 as in the first embodiment is performed immediately after the starting of the engine or after a period of not using filter 3.

Therefore, the present embodiment performs an initial operation of the apparatus for purifying exhaust gas, if controller 7 detects the starting of engine 1.

The composition of the present embodiment is omitted, since it is almost the same as that of the first embodiment.

Figure 7:
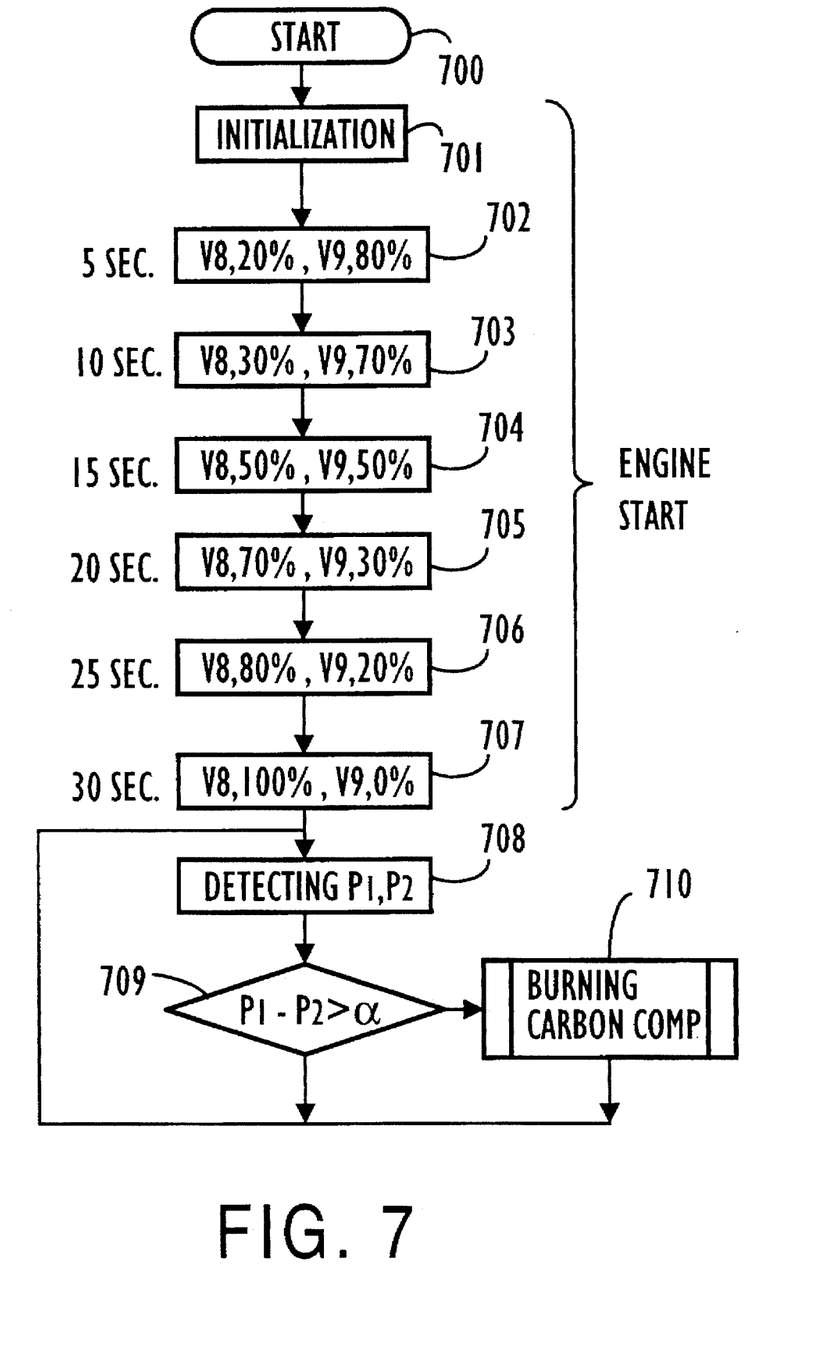
FIG. 7 is a flowchart that shows the operation of the second embodiment.

Next, the operation of the present embodiment is described in the following. FIG. 7 shows a flowchart of the operation of the present embodiment.

As shown in FIG. 7, if the engine starts, this exhaust gas purifying routine starts (Step 700). Next, Step 701 sets initial values and initializes valves 8, 9 and pressure sensors 15, 16. Next, Steps 702 to 707 performs an initial operation by controlling valves 8 and 9. Specifically, Step 702 opens valve 8 by 20% and valve 9 by 80%. This state of valves 8, 9 lasts 5 seconds. This time period of 5 seconds can be counted using the clock frequency of the CPU. Then Step 703 opens valve 8 by 30% and valve 9 by 70%. Similarly, Step 704 opens valve 8 by 50% and valve 9 by 50%, Step 705 opens valve 8 by 70% and valve 9 by 30%, Step 706 opens valve 8 by 80% and valve 9 by 20%, and Step 707 opens valve 8 by 100% and closes valve 9. The present embodiment assigns a time period of 5 seconds to each of Steps 703 to 707. Above Steps 701 to 707 are the initial operation, by which a rapid change of temperature and cracking of filter 3 are prevented. Next, the operation proceeds with Steps 708, 709, 710, which are the same as Steps 309, 310, 311 of the first embodiment so that their description is omitted here. How the temperature of filter 3 increases when the above initial operation is performed is almost the same as the temperature change in the first embodiment shown in FIG. 4.

As mentioned in the description of the first embodiment, if the driver wants to travel at the maximum power of the engine, he may close valve 8 and open valve 9 not to use filter 3. Further, if only urban areas are exhaust-gas regulated, then the driver may use filter 3 only when traveling in an urban area and may travel on roads outside urban areas without using filter 3. As in these cases, the temperature difference between filter 3 and the exhaust gas may become exceedingly great. For these cases, controller 7 holds information on the rates and duration of the openings of valves 8, 9, so that the above operation is performed to prevent cracking of filter 3, if the time during which valve 8 is closed has become more than a predetermined period, for example, 2 minutes.

Thus, the present embodiment controls valves 8, 9 not to give a rapid change of temperature to filter 3 by performing the initial operation depending on the time passing after the starting of the engine without using temperature detectors. Therefore, exhaust gas of high temperature does not rush into filter 3, so that cracking of filter 3 can be prevented.

The control of valves 8 and 9 are performed stepwise in both the first and the second embodiments. However, this control may be performed continuously. The present embodiment also digitizes the outputs of all the sensors, and controller 7 is programmed using a CPU and memory. However, the operation of controller can be realized by analog circuits.

[Third Embodiment]

Figure 8:
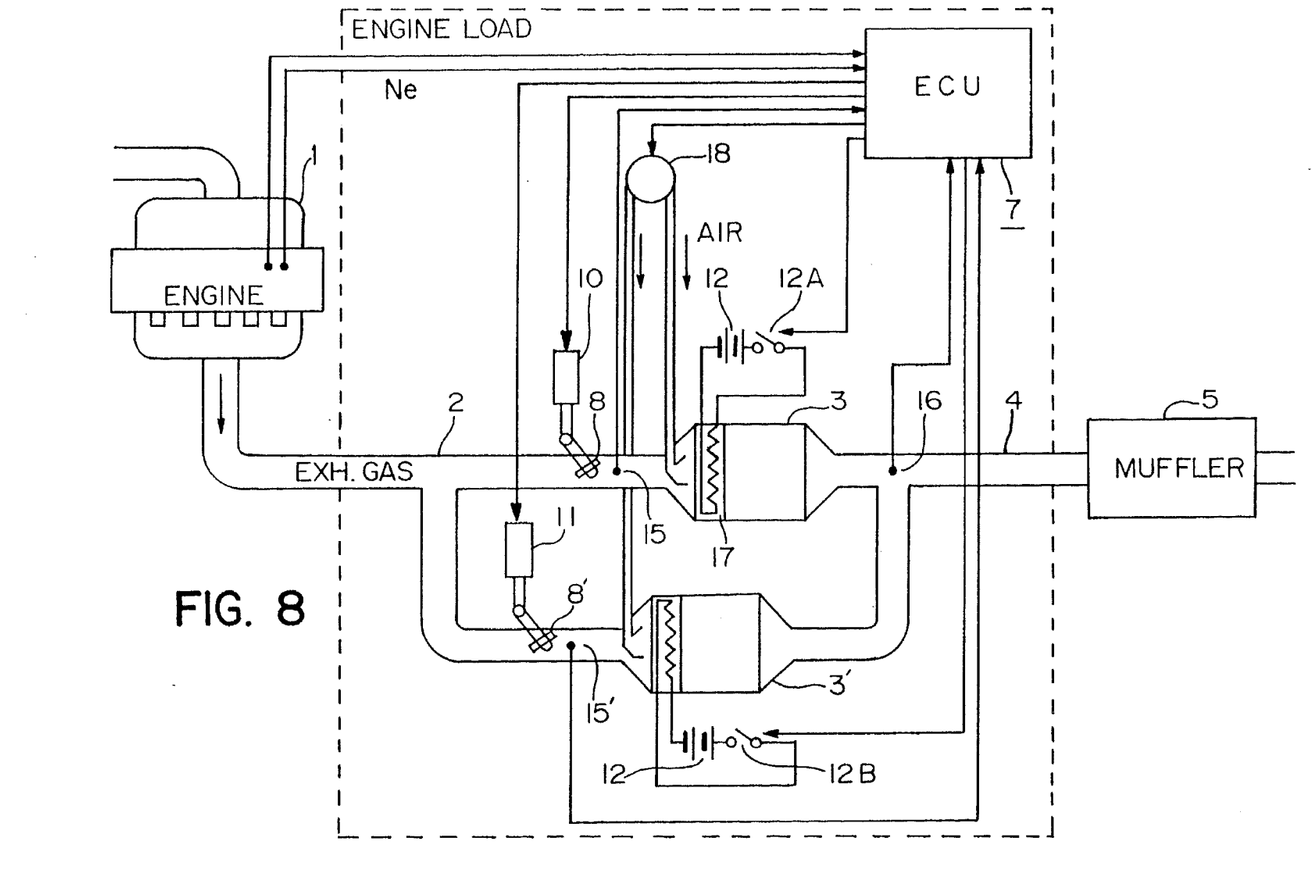
FIG. 8 shows a third embodiment in accordance with the present invention.

FIG. 8 shows a third embodiment of the present invention. As is apparent from comparison of FIG. 8 with FIG. 6 showing the second preferred embodiment, the present embodiment provides one more filter 3' on the way of bypass pipe 6. In other words, two filters 3 and 3' are arranged in parallel to each other between engine 1 and muffler 5.

Figure 9:
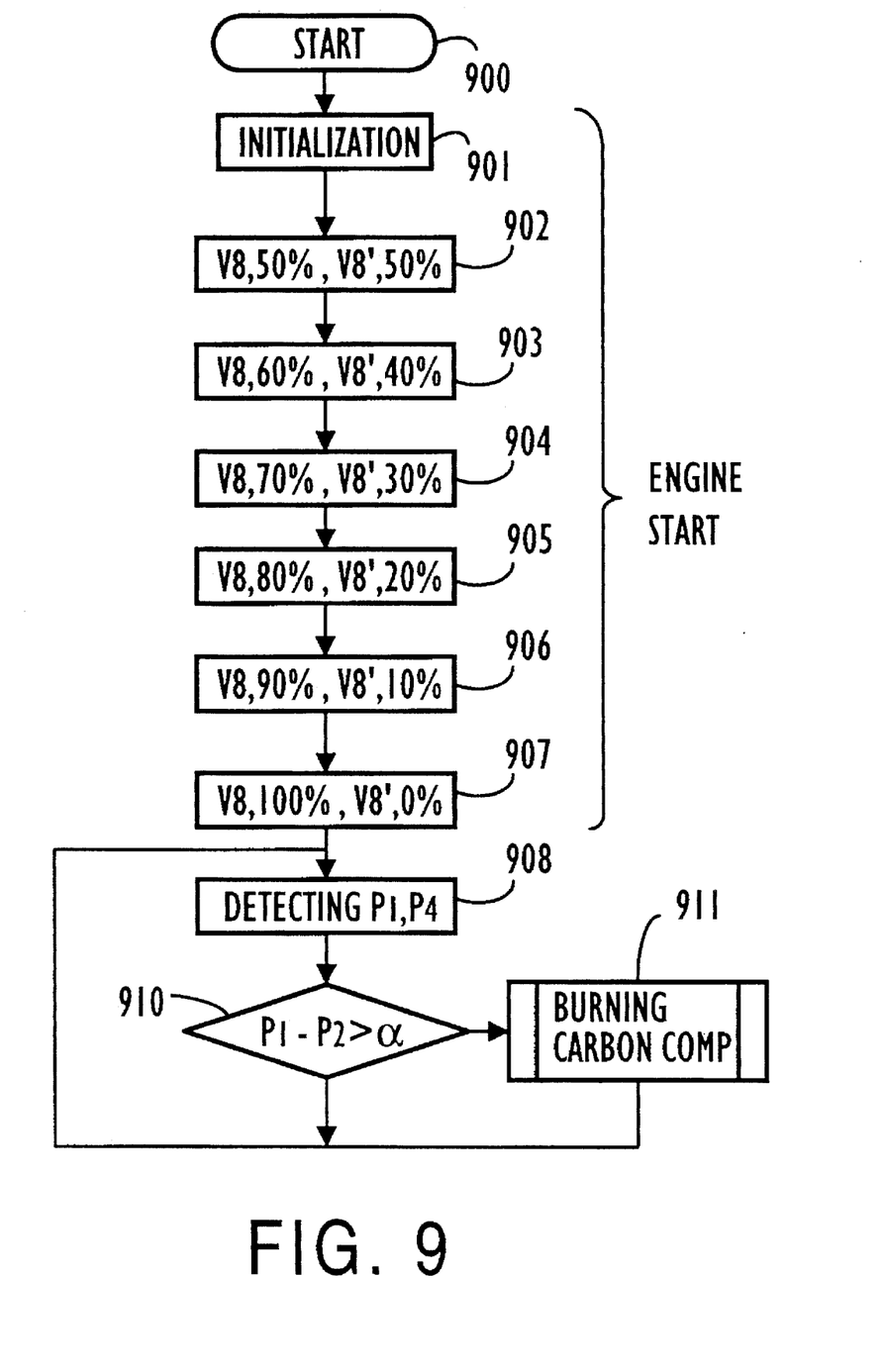
FIG. 9 is a flowchart that shows the operation of the third embodiment.

FIG. 9 is a flowchart of exhaust gas purifying routine in the third preferred embodiment. As is apparent from comparison of FIG. 9 with FIG. 7, steps from 900 to 911 correspond to steps 700 to 710 of FIG. 7. Only differences are that valve 9 is replaced to valve 8' in FIG. 9 and rates of opening and closing of valves 8 and 8' are differentiated from those in the second preferred embodiment. In the third embodiment, when this routine starts in response to the engine start, valves 8 and 8' are opened by 50% for first five seconds, respectively (Step 902). From 5 to 10 second, valves 8 and 8' are opened by 60% and 40%, respectively (Step 903). Thereafter, the opening rate of valve 8 is increased by 10% for every five seconds and that of valve 8' is decreased by 10% for every five seconds (Steps 904 to 907). Thus, after 30 seconds from the engine start, valve 8 is opened fully and valve 8' is closed completely.

According to the third embodiment, all exhaust gas can be purified even during the engine start.

It is to be noted that filter 3' may be identical to filter 3. In this case, filters 3 and 3' are useable as the main filter alternatively. However, it is also possible to use an auxiliary filter having a minor purifying faculty as filter 3'.

[Fourth Embodiment]

Figure 10:
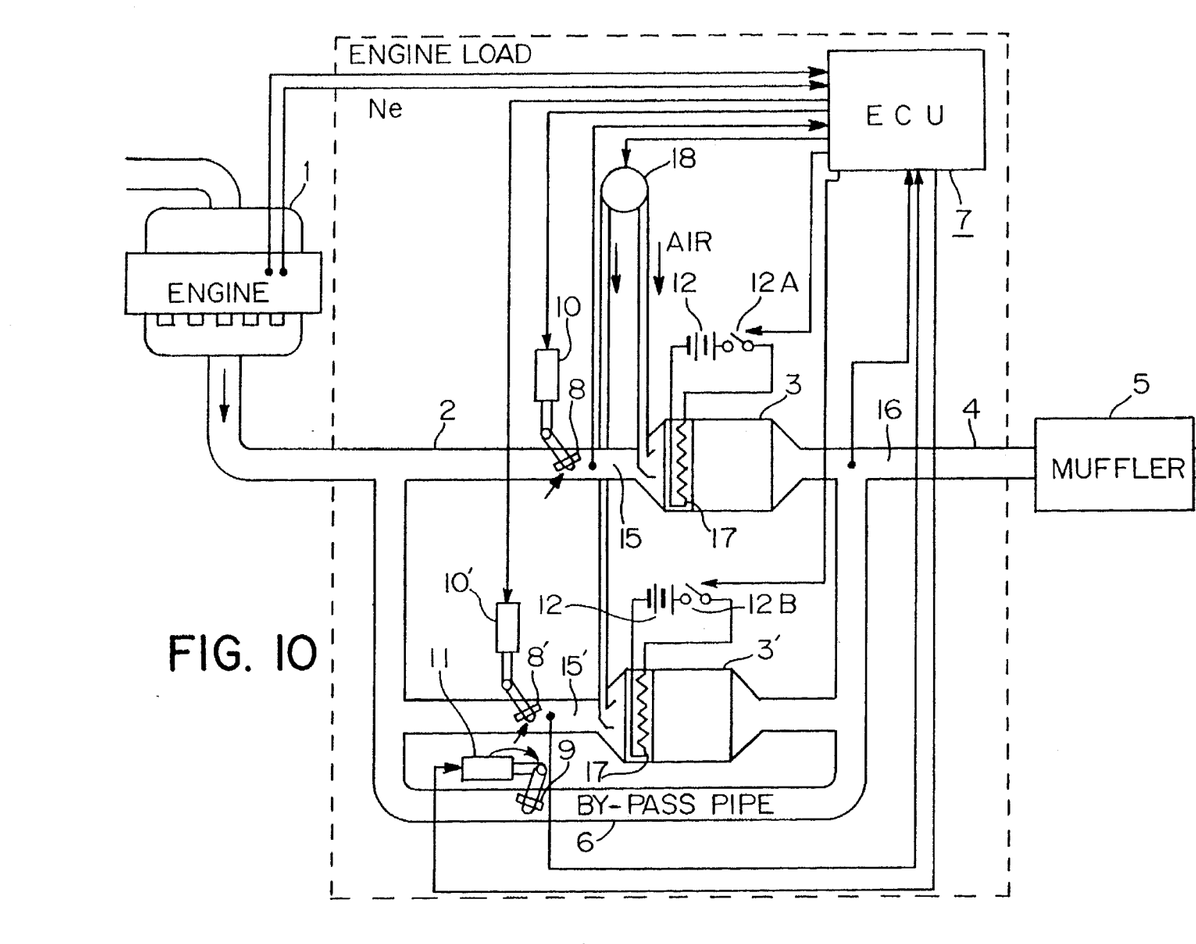
FIG. 10 shows a fourth embodiment in accordance with the present invention.

FIG. 10 shows a fourth embodiment of the present invention wherein there are provided two filters 3 and 3' arranged in parallel to each other and a bypass pipe 6 without any filter.

Figure 11:
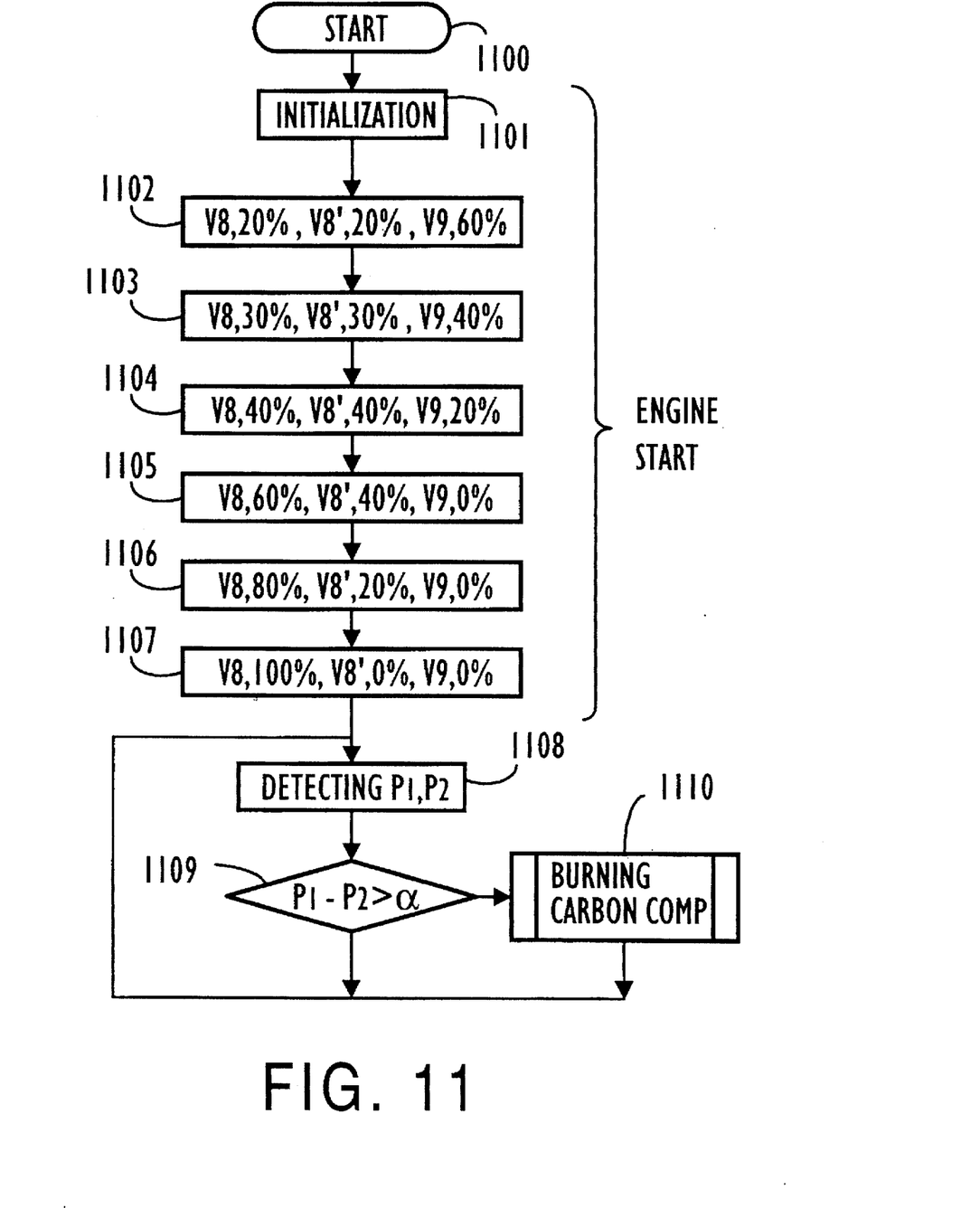
FIG. 11 is a flowchart that shows the operation of the fourth embodiment.

FIG. 11 shows a flowchart of exhaust gas purifying routine by the fourth embodiment. Steps 1100 to 1110 of FIG. 11 correspond to Steps 900 to 911 of FIG. 9 one to one. In this embodiment, the opening rate of valve 8 is increased 20%→30%→40%→60%→80%→100% for every five seconds. That of valve 8' is increased first 20%→30% →40% until 15 seconds and, then, decreased 40%→20%→0% for remaining 15 seconds. Valve 9 is opened by 60% for first five seconds and, thereafter, is gradually closed 40% →20%→0% and, after 20 seconds elapsed, it is closed completely.

According to the fourth embodiment, amount of unpurified exhaust gas can be minimized when compared with the first and second preferred embodiments.

Although the third and fourth embodiments are directed to the exhaust gas purifying during the engine start, they are applicable to the thermal control of filter as mentioned regarding the first preferred embodiment of the present invention.

The present invention prevents a rapid change of temperature and cracking of the exhaust gas filter, so that durable apparatus for cleaning exhaust gas can be provided.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An apparatus for purifying exhaust gas comprising a filter made of a ceramic material that traps and captures carbon components in the exhaust gas from a diesel engine and burns up the captured carbon components after a certain amount of said carbon components is deposited to activate said filter itself, a first pipe that leads the exhaust gas from the engine into said filter, a second pipe that leads the exhaust gas purified by said filter into a muffler, a by-pass pipe that branches off from said first pipe and is connected to said second pipe to by-pass the exhaust gas from said first pipe into said second pipe, a first valve that is installed inside said first pipe and controls the flow of exhaust gas into said filter, a second valve that is installed inside said by-pass pipe and controls the flow of exhaust gas in said by-pass pipe, a first temperature detector that detects the temperature of exhaust gas in said first pipe, a second temperature detector that detects the temperature of said filter, a heating means that heats up said filter, and a controller that controls said heating system, said first valve, and said second valve based on the outputs of said first temperature detector, said second temperature detector, and the engine, said controller controlling the opening and closing of said first valve and said second valve based on the temperature difference between the temperature detected by said first temperature detector and the temperature detected by said second temperature detector in such a way as said controller closes said first valve and opens said second value, if said temperature difference exceeds a selected value.

2. The apparatus for purifying exhaust gas as claimed in claim 1 further comprising one more filter arranged in parallel to said filter made of a ceramic material and third valve for controlling exhaust gas flow to said one more filter.

3. The apparatus for purifying exhaust gas as claimed in claim 1, further comprising a means for gradually opening said first valve and a means for gradually closing said second valve as the temperature difference between temperatures detected by said first and second temperature detectors decreases.

4. An apparatus for purifying exhaust gas comprising a filter made of a ceramic material that impacts and absorbs carbon components in the exhaust gas from an engine and burns up the adhering carbon components after a certain amount of said carbon components is deposited to activate said filter itself, a first pipe that leads the exhaust gas from the engine into said filter, a second pipe that leads the exhaust gas purified by said filter into a muffler, a by-pass pipe that branches off from said first pipe and is connected to said second pipe to by-pass the exhaust gas from said first pipe into said second pipe, a first valve that is installed inside said first pipe and controls the flow of exhaust gas into said filter, a second valve that is installed inside said by-pass pipe and controls the flow of exhaust gas in said by-pass pipe, a heating means that heats up said filter, and a controller that controls said heating system, said first valve, and said second valve based on the output of the engine, said controller controlling the opening and closing of said first valve and said second valve based on the lapse of time after the starting of the engine in such a way as said controller closes said first valve and opens said second valve, when the engine is started.

5. The apparatus for purifying exhaust gas as claimed in claim 4 further comprising one more filter arranged in parallel to said filter made of a ceramic material and third valve for controlling exhaust gas flow to said one more filter.

6. The apparatus for cleaning exhaust gas of claim 4, wherein said controller further comprises a means for storing the angles and the duration of the opening of said first valve and said second valve to control the opening and closing of said first valve and said second valve when the exhaust gas has not flowed into said filter for more than a selected time period.

7. The apparatus for purifying exhaust gas as claimed in claim 4, further comprising a means for gradually opening said first valve and a means for gradually closing said second valve as time from the engine start elapses.

* * * * *